United States Patent [19]

Bouillé

[11] 4,445,849

[45] May 1, 1984

[54] DEVICE FOR THERMAL TREATMENT OF SCRAP

[75] Inventor: Bernard Bouillé, St. Florentin, France

[73] Assignee: Swiss Aluminium Ltd., Chippis, Switzerland

[21] Appl. No.: 379,456

[22] Filed: May 18, 1982

[30] Foreign Application Priority Data

May 25, 1981 [CH] Switzerland ............ 3401/81

[51] Int. Cl.³ .......................... F27B 9/02; F27B 3/04
[52] U.S. Cl. ..................... 432/128; 266/901; 414/192; 432/133; 432/164
[58] Field of Search .............. 432/128, 133, 163, 164; 414/192; 266/901

[56] References Cited

U.S. PATENT DOCUMENTS

| | | | |
|---|---|---|---|
| 2,624,565 | 1/1953 | Kompart | 266/901 |
| 3,172,648 | 3/1965 | Brickard | 432/133 |
| 3,234,010 | 2/1966 | Mahony | 266/901 |
| 3,537,694 | 11/1970 | Rinesch et al. | 266/901 |
| 3,982,889 | 9/1976 | Olson | 432/82 |
| 4,328,388 | 5/1982 | Longenecker | 266/901 |

Primary Examiner—John J. Camby
Attorney, Agent, or Firm—Bachman and LaPointe

[57] ABSTRACT

A device for thermally treating scrap employs a charging facility for conveying scrap to a furnace chamber. The charging facility is fitted with a waste gas flue and a loading port and has a pre-loading space in which the scrap is pre-heated. The device is easily operated and can be run with relatively little loss of energy by having the pre-loading space of the charging facility releasably connected to the furnace chamber and/or waste gas flue such that the pre-loading space is fed with waste heat from the furnace chamber. Preferably the pre-loading space is part of a waste gas or waste heat circuit. The pre-loading space is also provided with an extendable unit which can be pushed into the mouth or loading port of the furnace for feeding the scrap to the furnace.

9 Claims, 10 Drawing Figures

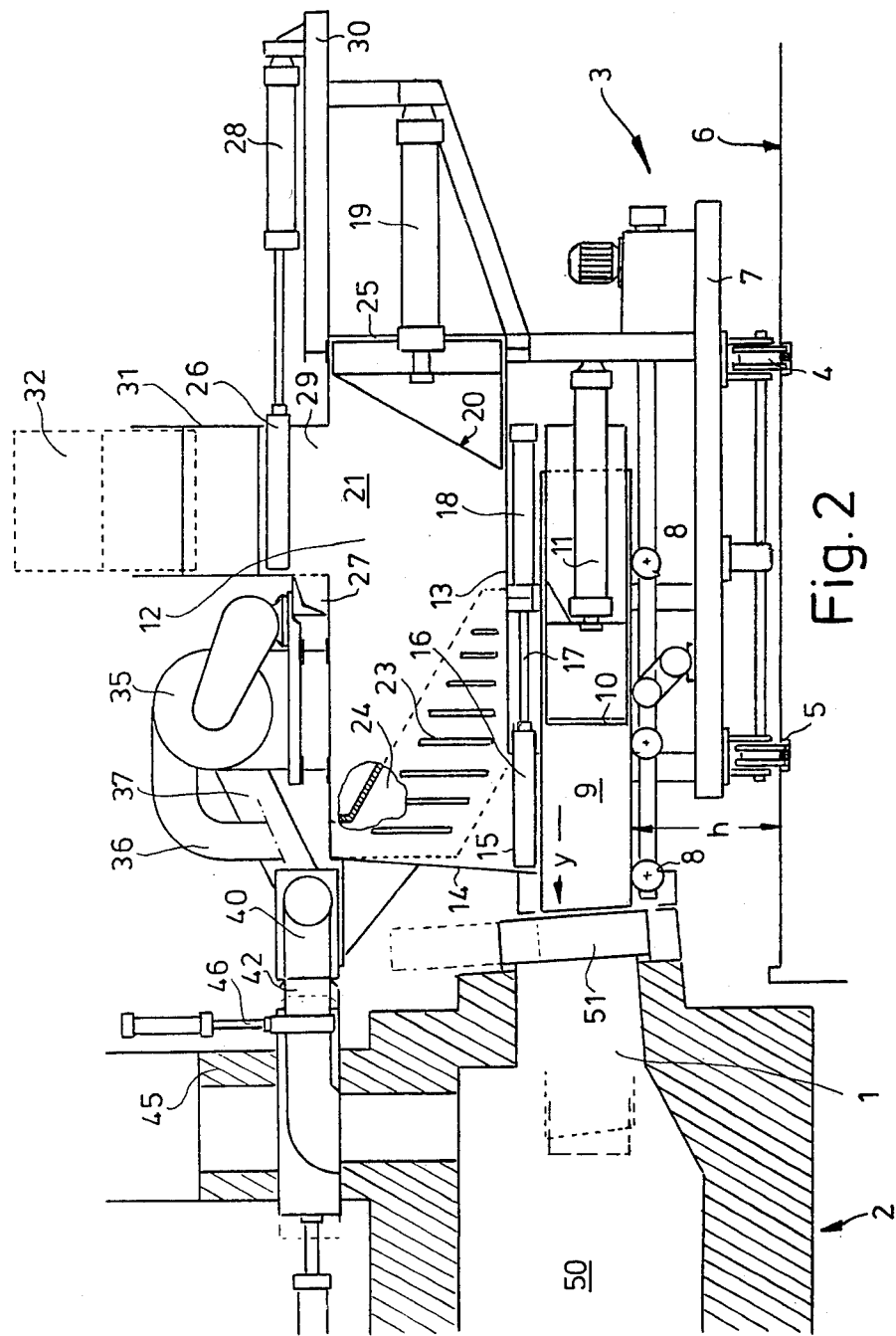

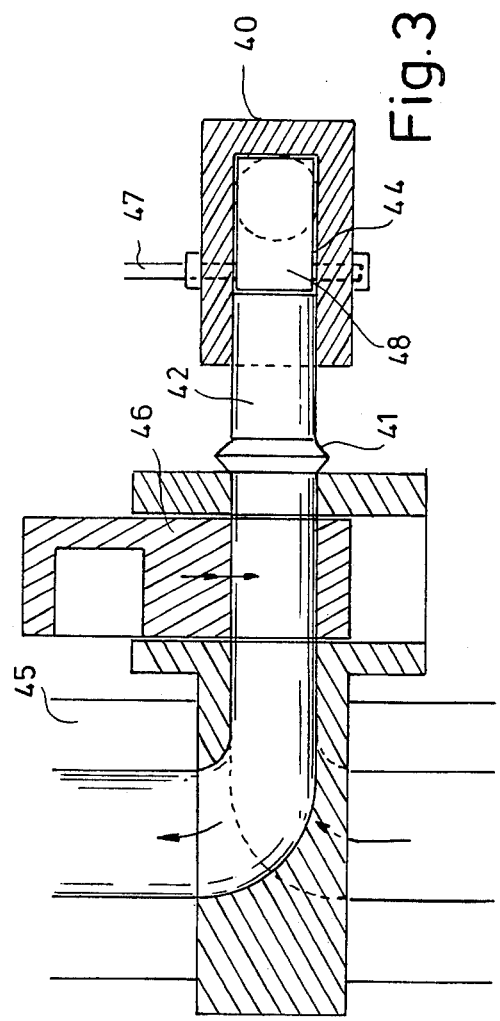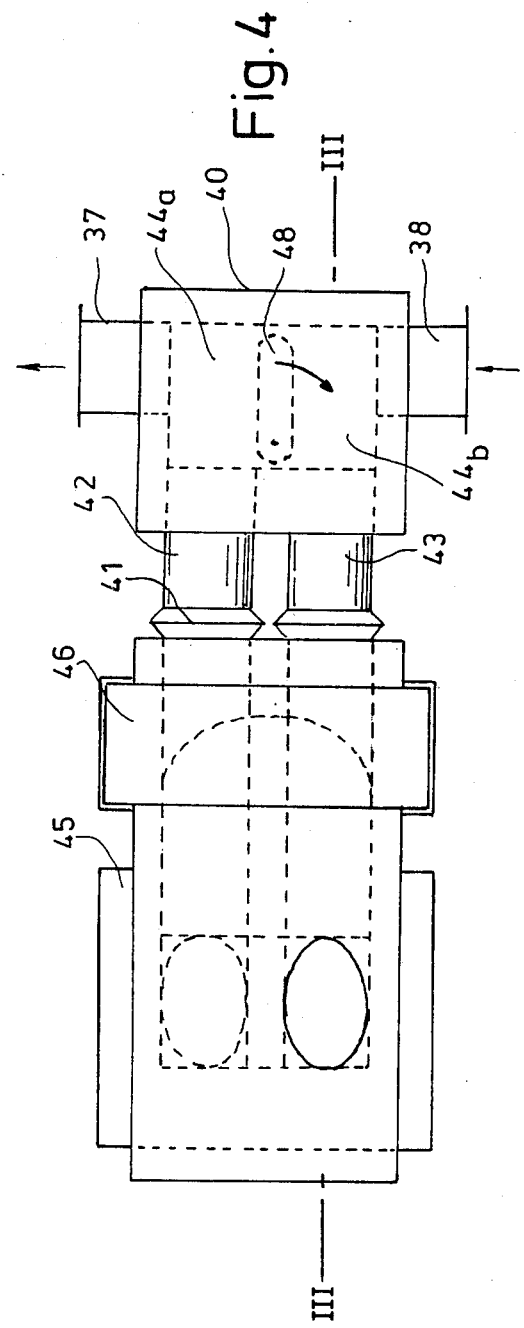

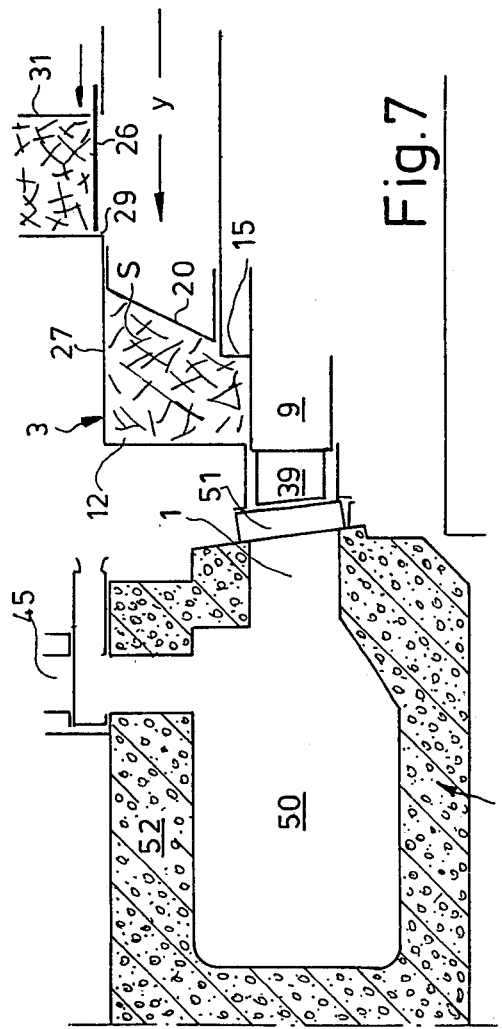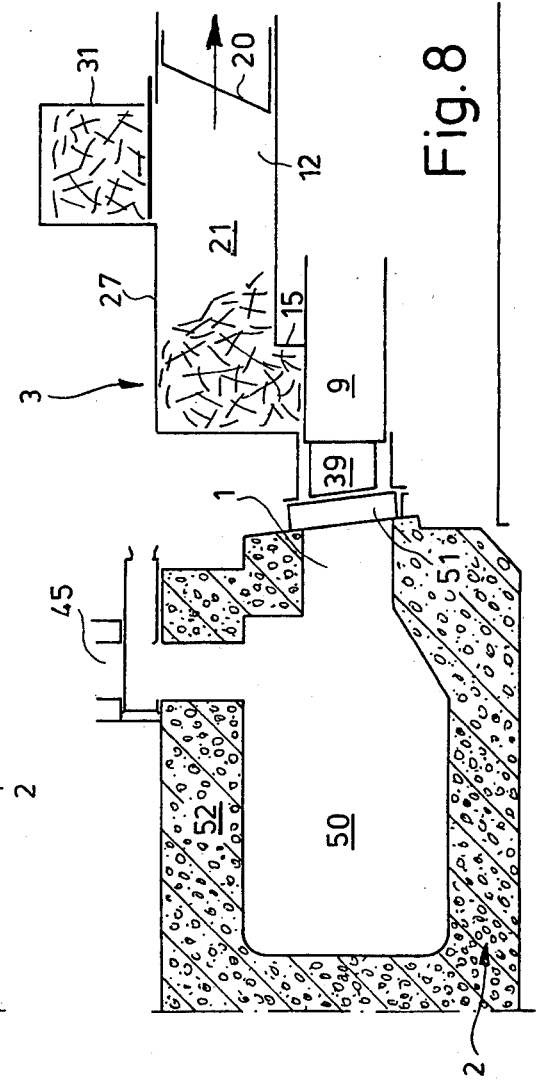

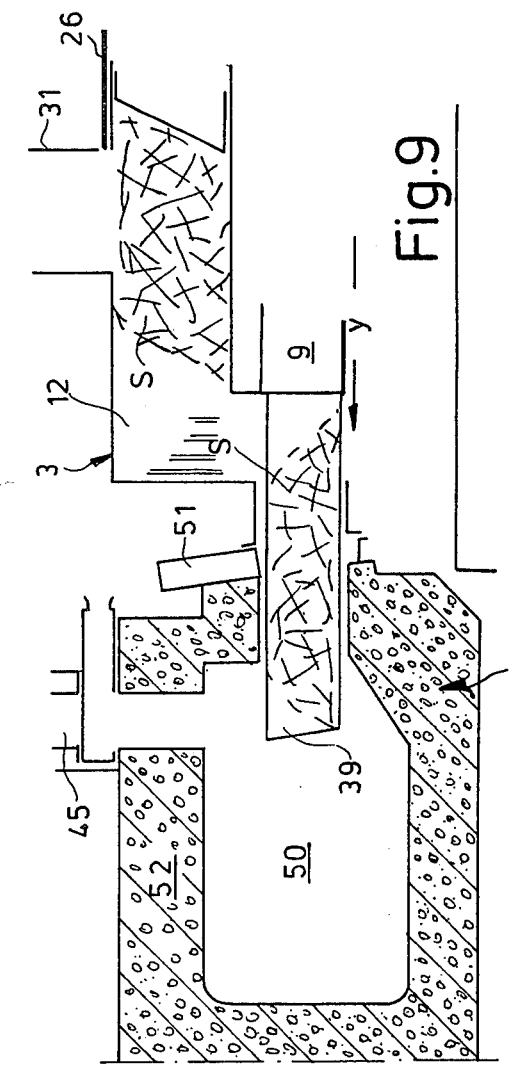
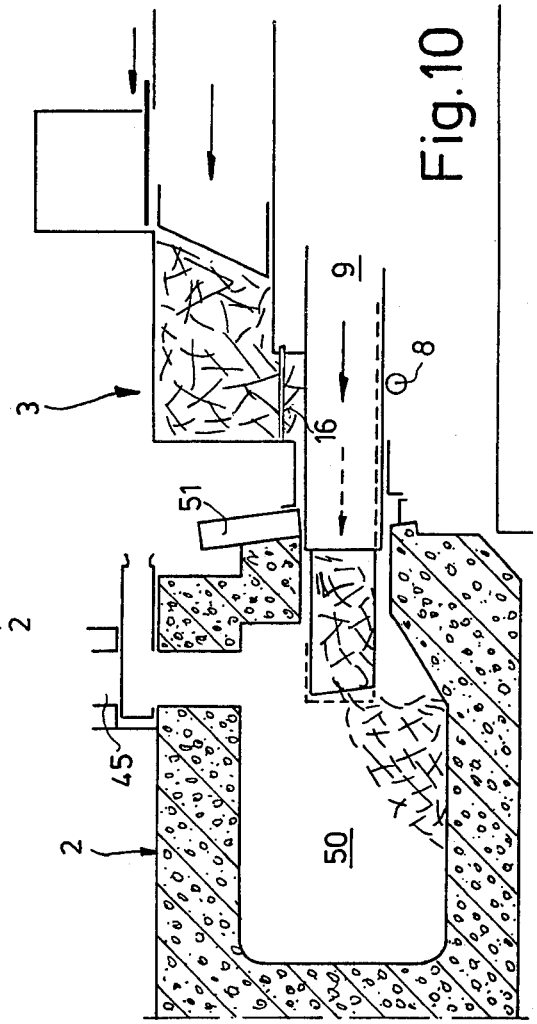

DEVICE FOR THERMAL TREATMENT OF SCRAP

BACKGROUND OF THE INVENTION

The present invention is drawn to a device for thermally treating scrap using a charging facility for conveying scrap to a furnace chamber. The charging facility is fitted with a waste gas flue and a loading port, and is further provided with a loading space in which the scrap is pre-heated.

U.S. Pat. No. 3,383,099 describes a device in which a charge of scrap is stored for pre-heating in the pre-loading space of a container and hot gases are passed through the scrap. The gases are produced by gas or oil burners, with respect to the general use of energy, represents an extremely uneconomical method of heating gases as the large amount of air which must be heated later escapes with a considerable quantity of heat loss.

It is also known to heat moveable scrap containers in special heating units and then to transport these containers to a melting furnace where the pre-heated scrap is charged to the furnace chamber. In this case the activities and facilities required involve considerable expense. In view of the foregoing it is the principal object of the present invention to develop a device for pre-heating scrap which is easy to operate and can be run with relatively little energy loss.

SUMMARY OF THE INVENTION

The foregoing object is achieved by way of the present invention wherein the pre-loading space of the charging facility is releasably connected to the furnace chamber and/or waste gas flue and is supplied with waste heat from the furnace. The pre-loading space is further provided with an extendable loading facility which can be pushed into the loading port of the furnace.

As a result of the foregoing arrangement the waste heat from the furnace itself is used for pre-heating the scrap and the extendable loading facility moves the pre-heated scrap directly from the pre-loading space to the furnace chamber thereby preventing the heated scrap from cooling.

A particularly suitable arrangement is a pre-loading space which is surrounded by a housing having an upper inlet for the scrap and an outlet which is displaced sideways with respect to the inlet and connects up to the loading facility at least one of the openings and preferably both are shut off with a closure facility. The result is a pre-loading space which is sealed off from the outside air and, in accordance with a further feature of the present invention, forms part of a waste gas or waste heat circuit where the scrap can be held for preheating.

A basic improvement in operation with the device of the present invention is that the loading of the pre-heating region, for example in a charging wagon, takes place as much as possible without long interruption while at the same time enabling adequate holding time for preheating. This is achieved by the separation of the inlet and outlet openings for the scrap which falls through the inlet onto the floor of the pre-loading space and is moved to the outlet by means of a pushing device or the like. In addition, the scrap intersects the hot waste gas stream in a region in which there are on one sidewall of the pre-loading space inlets for the hot waste gas stream and on the opposite sidewall outlets for the same. Usefully these inlets and outlets connect up to a waste heat supply pipe and flue pipe respectively. If desired, at least one blower may be fitted to the supply pipe and/or flue pipe. It has also been found advantageous to allow the supply pipe to connect up to a mixing facility and to be able to regulate the amount of hot waste gas supplied and the composition of the gas in terms of waste gas/air mixture. It is preferred to join the supply pipe and the exhaust pipe to a mixing facility the interior of which is divided by at least one control device into two chambers, each chamber connecting up to one of the pipes. The setting of a control device, for example a device in the form of a tiltable flap or baffle, determines in one embodiment the amount of fresh air and in another embodiment the ratio of hot waste gas to the waste heat extracted.

In a particularly preferred embodiment the device according to the present invention serves a battery of melting furnaces as they have common charging wagon. It has therefore been found advantageous to provide pipe couplings with closure facilities in the supply pipe and the exhaust flue for the hot waste gas stream between the mixing facility and the furnace chamber or the exhaust gas flue. In addition, pressure regulating facilities can be provided in each of the pipes for the hot waste gas in order to adjust the device to better suit the prevailing conditions.

It has been found to be particularly favorable to determine the position pre-heating zone inside the pre-loading space by means of slits in the sidewalls. The heights of the slits should preferably increase in the direction of loading in order to best heat the scrap which is closest to the furnace.

The actual facility for loading the scrap into the furnace chamber comprises a telescopically reclined extendable loading trough which is pushed into the mouth of the furnace when the furnace door is opened. The charge of scrap is then loaded into the center of the furnace chamber by means of a scrap pushing device. According to a further feature of the present invention, the loading trough is made of a refractory material and in its extended position projects into the furnace chamber.

BRIEF DESCRIPTION OF THE DRAWINGS

Further advantages, features and details of the present invention will be made clear with the aid of the following drawings wherein

FIG. 2 is a longitudinal section through the parts of the device shown in FIG. 1.

FIG. 3 is a enlarged view of part of the device shown in FIG. 2 in a modified form.

FIG. 4 is a plan view of the details shown in FIG. 3.

FIG. 7–10 are further schematic drawings of the sequence of the process.

DETAILED DESCRIPTION

Figure 1:
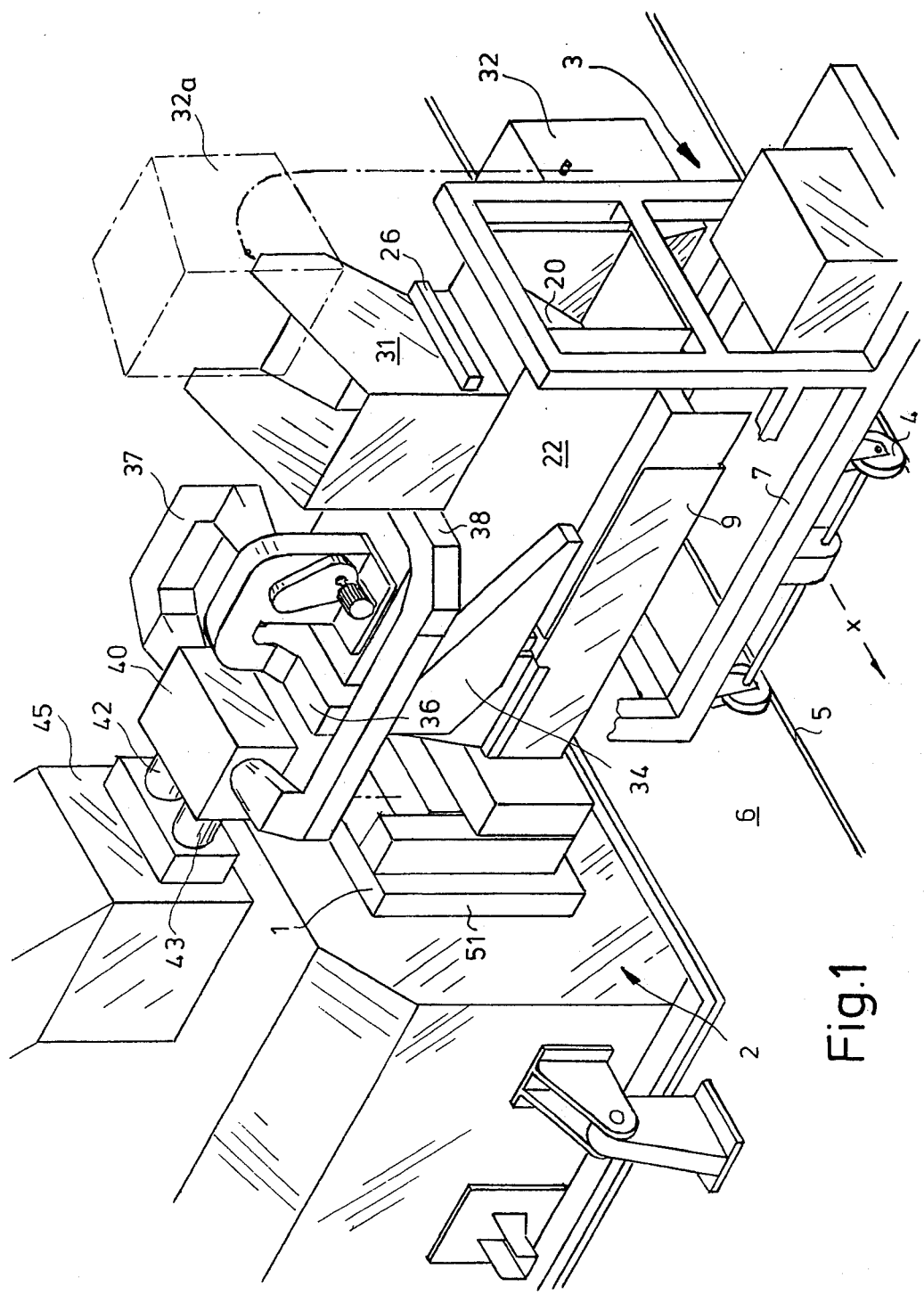
FIG. 1 is a perspective view of part of a melting furnace and a device for charging the furnace with scrap.

FIG. 1 shows a loading wagon 3 which has been moved in front of the loading port 1 of a melting furnace 2 to charge it with scrap. The wheels 4 of the wagon run in track recesses 5 in the surface 6 of a platform in front of the furnace 2.

Provided at a height h from the platform floor 6 is a horizontal loading trough 9 which is U-shaped in cross section and can be moved perpendicular to the direction of movement X of the wagon 3 on rollers 8 on a supporting frame 7 mounted on the wagon 3. Situated in this trough 9 is a box 10 which can be pushed in the direction of the arrow y by a piston arrangement 11. Extending over the loading trough 9 is a pre-charging space 12 with an outlet 15 in its floor 13 next to the wall 14 facing the melting furnace 2. As shown in FIG. 2 the outlet 15 is closed off by a horizontal slide 16 which is attached to the piston rod 17 of a hydraulic piston 18. A feeder plate 20 inside the pre-loading space 12 and inclined to the floor 13 can be pushed in the loading direction by hydraulic piston 19. During the stroke moving the feeder plate 20 to the front wall 14, the plate 20 passes air slits 23 in the sidewalls 21, 22 of space 12. These slits 23 connect up the pre-loading space 12 to a duct 24 at the side.

Near the rear wall 25 of the space 12 is an inlet slit 29 in cover 27 which is provided with a closing-off plate 26 which is actuated by a piston 28 supported on a beam 30 mounted on the loading wagon 3.

Figures 5, 6:
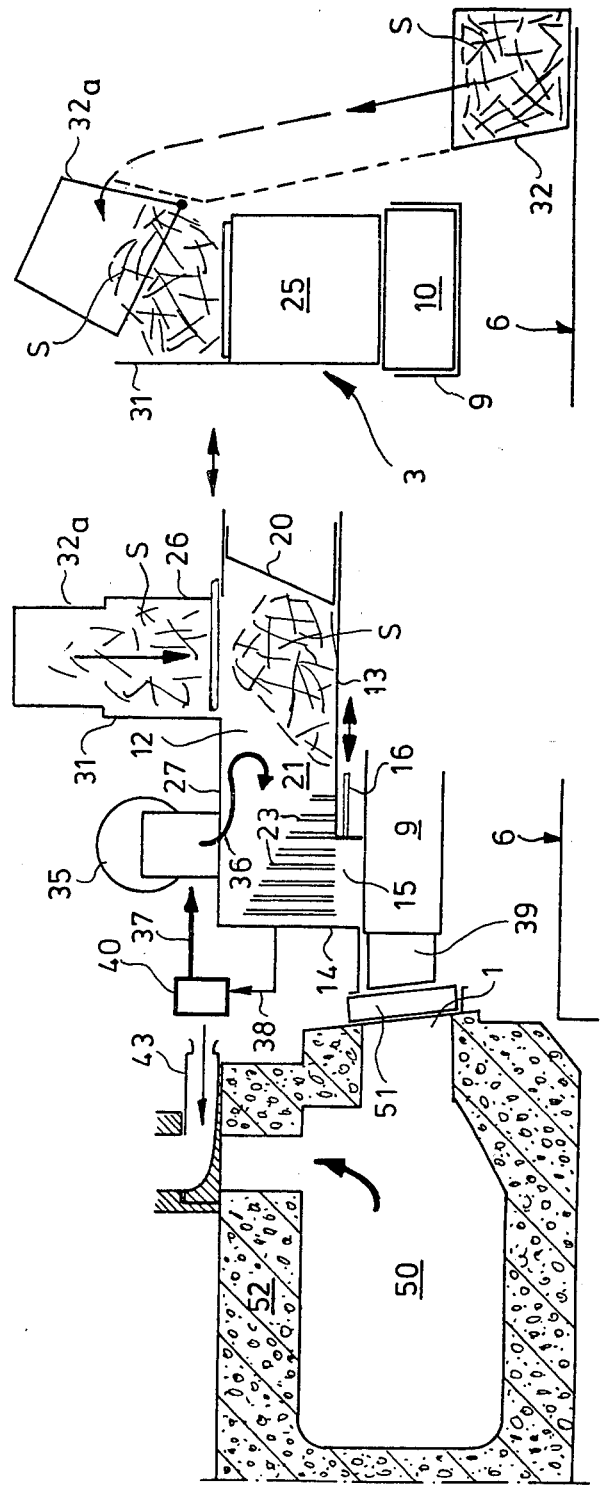
FIG. 5 is a schematic longitudinal section through the parts of the device at the start of the process.
FIG. 6 is an end view of a part shown in FIG. 5.

Above plate 26 is a chute 31 which, as is shown best in FIG. 1, can accept a loading basket 32 containing scrap. This basket 32 is loaded and then raised to the chute 31 as indicated by 32a in FIGS. 1 and 6.

Mounted on the cover 27 is a blower 36 which has its outlet side connected to an air conduit 36 of a duct 34 positioned on the second sidewall 22 of the pre-loading space 12 and its inlet side connected to a gas mixer 40 via conduit 37. An air pipe 38 likewise connects the other duct 24 to that gas mixer 40.

The gas mixer 40 is, as can best be seen in FIGS. 3 and 4, connected via couplings 41 and two pipes 42, 43 to a fume extractor 45 for the furnace 2 or, in another embodiment, to a pressure regulating facility 46 on the fume extractor 45.

The fumes rising from the furnace chamber 50 enter via pipe 42 the interior 44 of the gas mixer 40. The gas mixer has a flap 48 mounted on a vertical shaft 47 which acts as a baffle plate and guides the fumes, when in the position shown in FIG. 4, in space 44a to the air conduit 37. The baffle plate can be manipulated from outside. These gases then pass through the pre-loading space 12 to reach the other space 44b via conduit 38. From there the gases then flow off via pipe 43.

From FIG. 3 and 4 it is clear that the position of baffle flap 48 and/or the pressure regulating facility 46 influence both the quantity of waste gas and its pressure in the pre-loading space 12.

When the scrap S in the loading basket 31 has been introduced into space 12 via chute 31, the inlet 29 is closed off by slide 26. Another load of scrap can then be deposited on slide 26.

The first charge of scrap on the floor 13 of space 12 remains remote from the flow path of the waste gas as determined by the opposite lying slits 23 until it is pushed in the direction y by the inclined feeder plate 20. The scrap S thus reaches the front part of the space 12 and is then in the flow path of the waste gas. The scrap S then falls, into the two-part loading trough 9, the front trough 39 of which is pushed, in accordance with the described process steps, up to the furnace door 51. Also indicated in the figures in the lining 52 of the furnace 1.

In FIG. 8 the feeder plate 20 has again been drawn back behind the inlet 28 so that a further load of scrap can be fed to the pre-loading space 12.

As shown especially in FIG. 9, the heap of scrap S blocks up the front of space 12 thus effectively blocking the way of the waste gases to the chute 31 so that the furnace door can be raised and the front trough 39 pushed forward into the furnace chamber 50 without problem.

The front trough 39 then projects into this space 50 and the scrap S pushed out of the trough by means of the box 10 shown in FIG. 2.

The movement of the loading trough 9 on its rollers 8 is indicated in FIG. 10. With this movement the scrap S is pushed into the furnace chamber 50. Before or during the charging of the furnace, the outlet 15 is again closed off by the horizontal slide 16 so that the described cycle can start again, in the course of which the scrap S is intensely pre-heated by the waste gases. It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An apparatus for pre-heating and feeding metal scrap to a furnace chamber comprising a heating chamber having a top wall, a bottom wall and a sidewall defining said chamber, a scrap metal inlet provided in said top wall at a location remote from said furnace chamber and a scrap metal outlet provided in said bottom wall at a location proximate to said furnace chamber, means provided in said heating chamber for moving said metal scrap from said scrap metal inlet to said scrap metal outlet, loading means positioned below said heating chamber adjacent to said scrap metal outlet for receiving said scrap metal from said scrap metal outlet, said loading facility including means for feeding said metal scrap to said furnace chamber and means associated with said furnace chamber and said heating chamber for communicating the heated waste gas from said furnace chamber to said heating chamber for pre-heating said metal scrap.

2. An apparatus according to claim 1 wherein closure means is provided for said scrap metal outlet for selectively communicating said heating chamber with said loading facility.

3. An apparatus according to claim 1 wherein said sidewall is provided with inlet means for said heated waste gas and is provided with outlet means for said heated waste gas.

4. An apparatus according to claim 3 wherein said heated waste gas inlet means and outlet means comprises a plurality of slits the size of which increase in size from said scrap metal inlet to said scrap metal outlet.

5. An apparatus according to claim 1 wherein said heated waste gas passes over said scrap metal outlet.

6. An apparatus according to claim 1 wherein said means for communicating the heated waste gas from said furnace chamber to said heating chamber includes a supply pipe and an exhaust pipe and a blower for circulating the heated waste gas.

7. An apparatus according to claim 6 wherein said means for communicating the heated waste gas from said furnace chamber to said heating chamber further includes a mixing facility for mixing air with said heated waste gas.

8. An apparatus according to claim 1 wherein said loading facility comprises a first portion moveable between a first position remote from said furnace chamber and a second position proximate to said furnace chamber.

9. an apparatus according to claim 8 wherein said first portion telescopically receives a second refractory portion which is selectively moveable with respect to said first portion.

* * * * *